Dec. 15, 1925.

F. A. REYNOLDS 1,565,960

APPLE CORING AND PARING MACHINE

Filed Aug. 14, 1925     8 Sheets-Sheet 1

Inventor
Frank A. Reynolds
By Harold R. Stonebraker
his Attorney

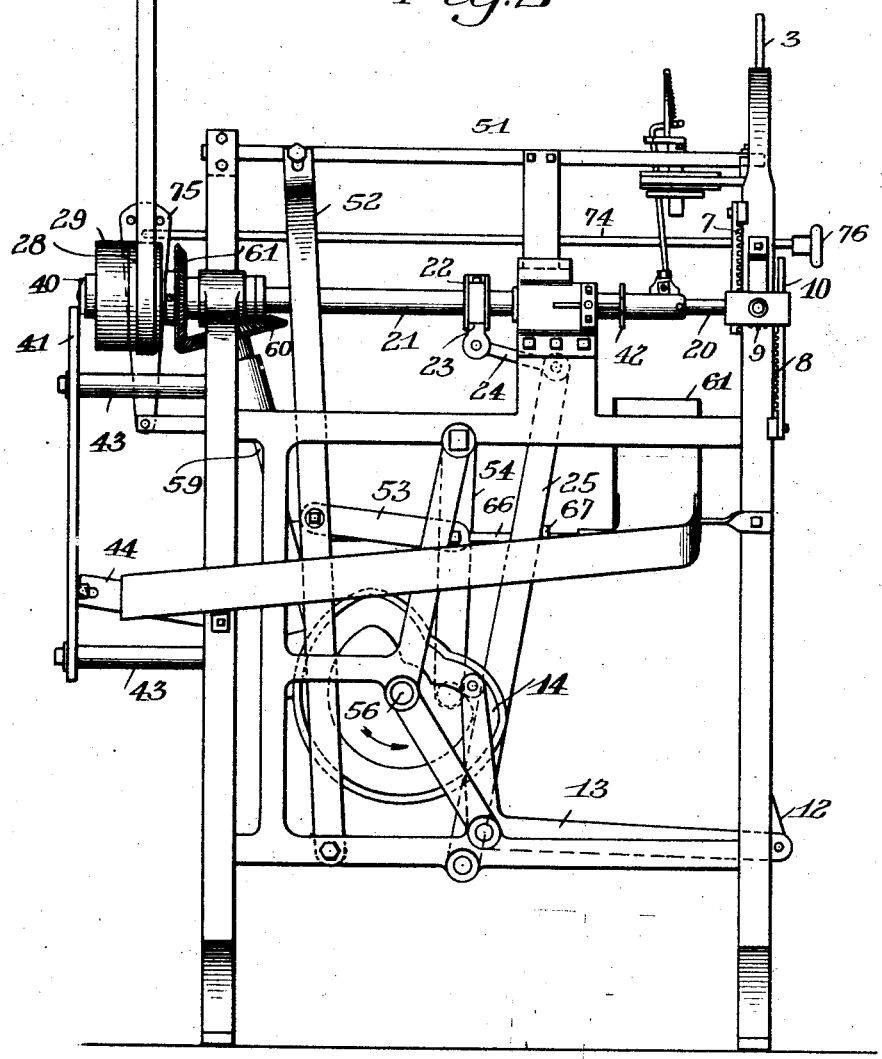

Dec. 15, 1925.
F. A. REYNOLDS
APPLE CORING AND PARING MACHINE
Filed Aug. 14, 1925    8 Sheets-Sheet 3
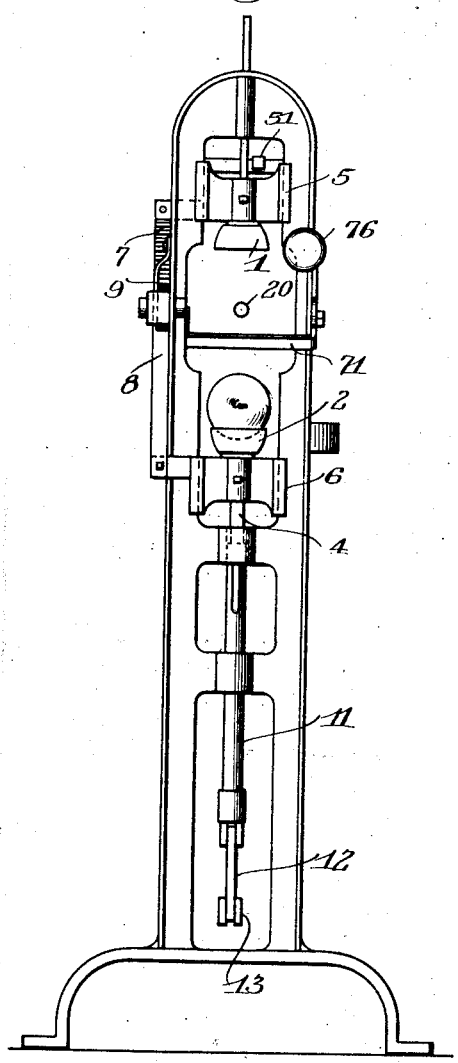
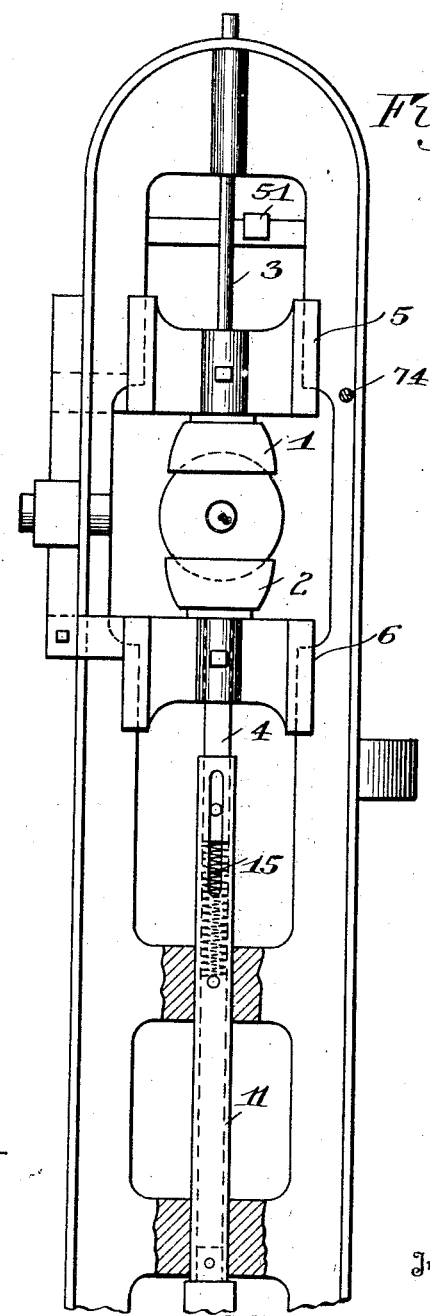
Inventor
Frank A. Reynolds
By Harold E. Stonebraker
his Attorney

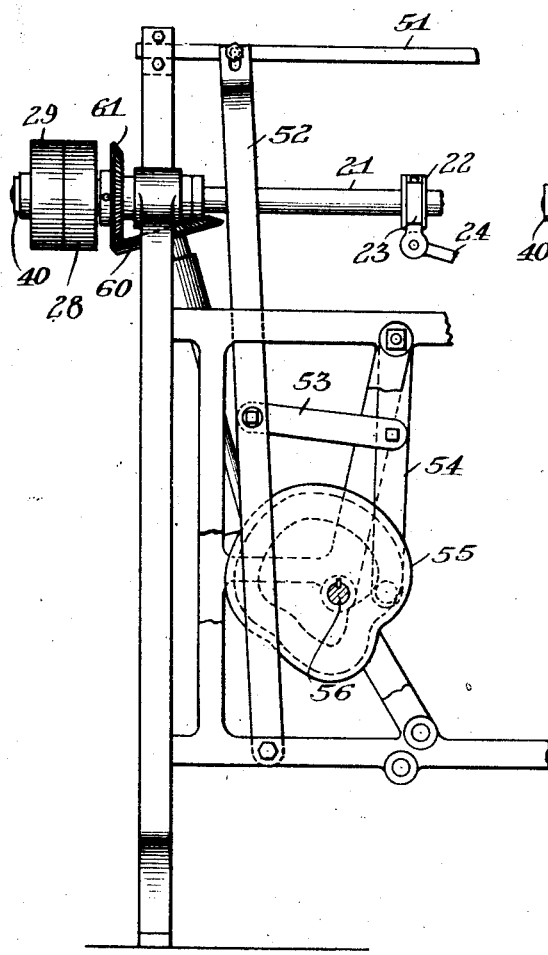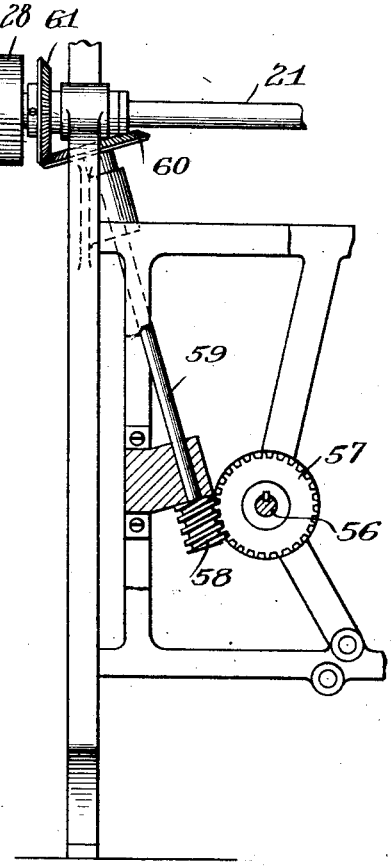

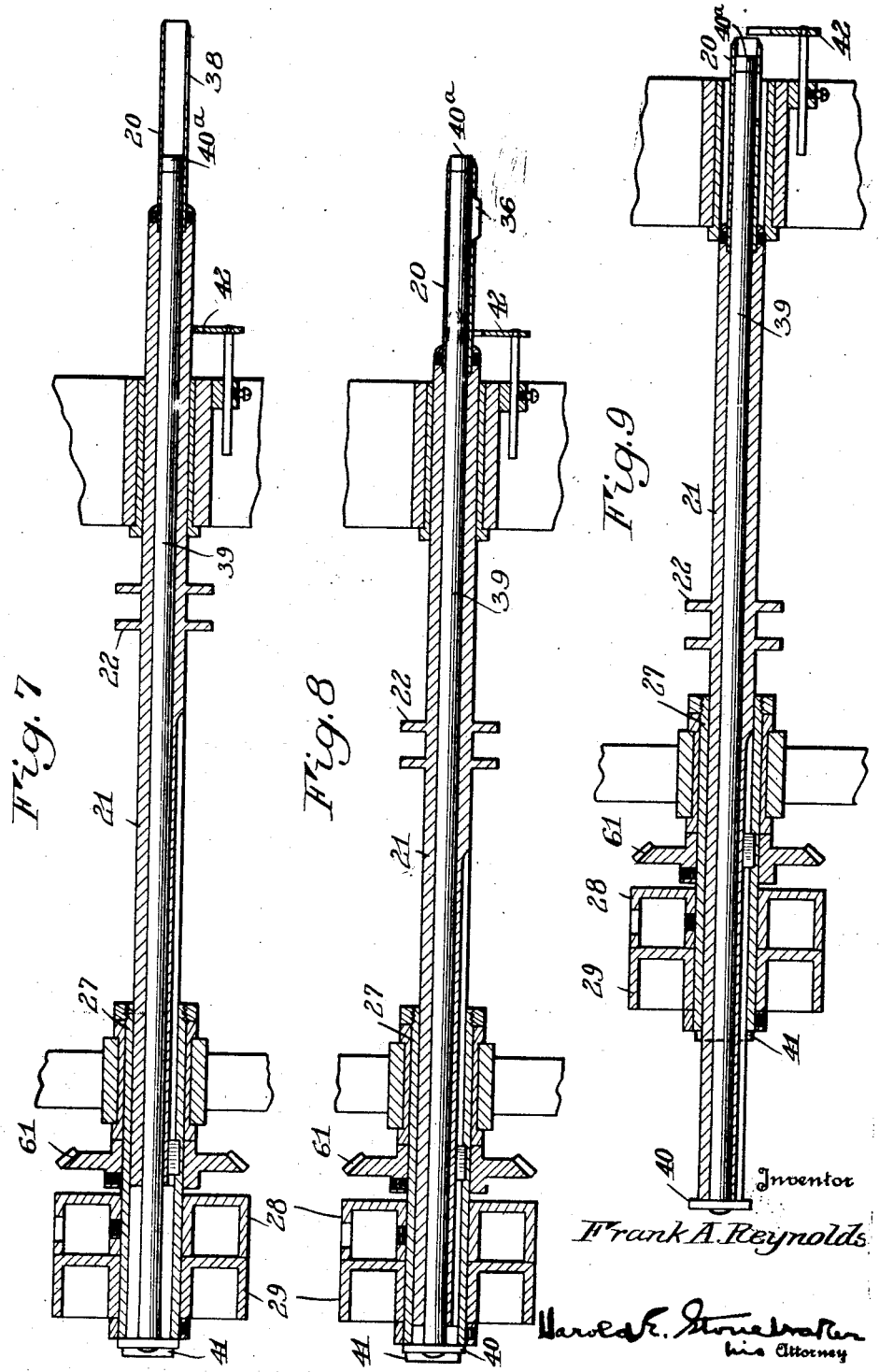

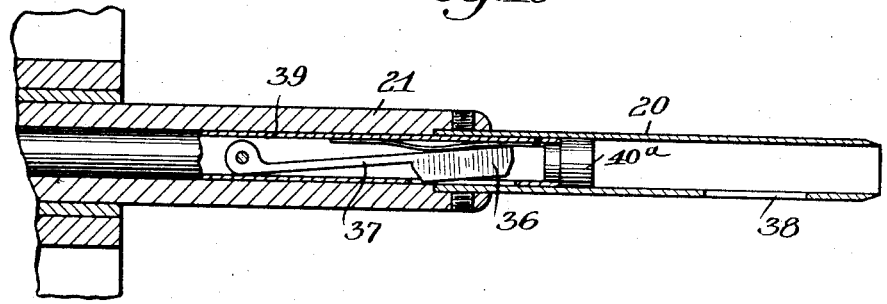
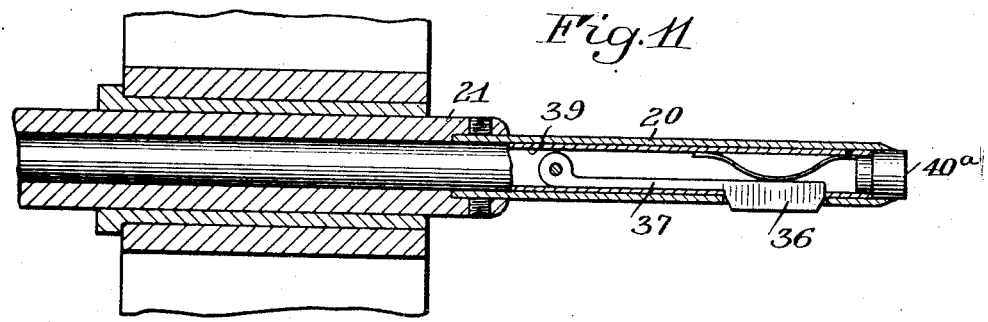
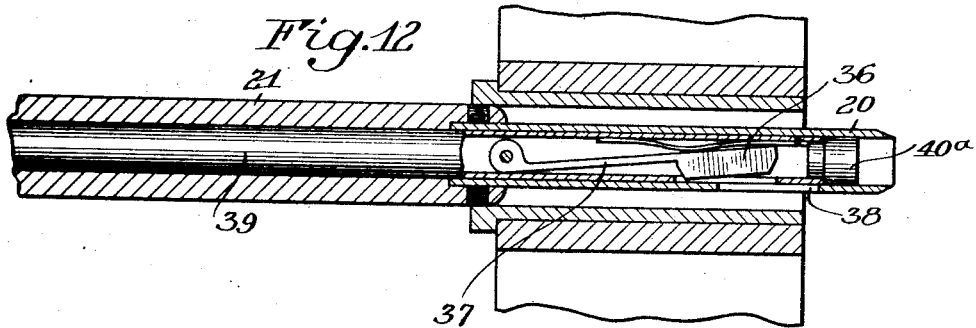

Dec. 15, 1925.　　　　　　　　　　　　　　　　　1,565,960
F. A. REYNOLDS
APPLE CORING AND PARING MACHINE
Filed Aug. 14, 1925　　　　8 Sheets-Sheet 7

Inventor
Frank A. Reynolds
By Harold E. Stonebraker
his Attorney

Dec. 15, 1925.　　　F. A. REYNOLDS　　　1,565,960
APPLE CORING AND PARING MACHINE
Filed Aug. 14, 1925　　　8 Sheets-Sheet 8
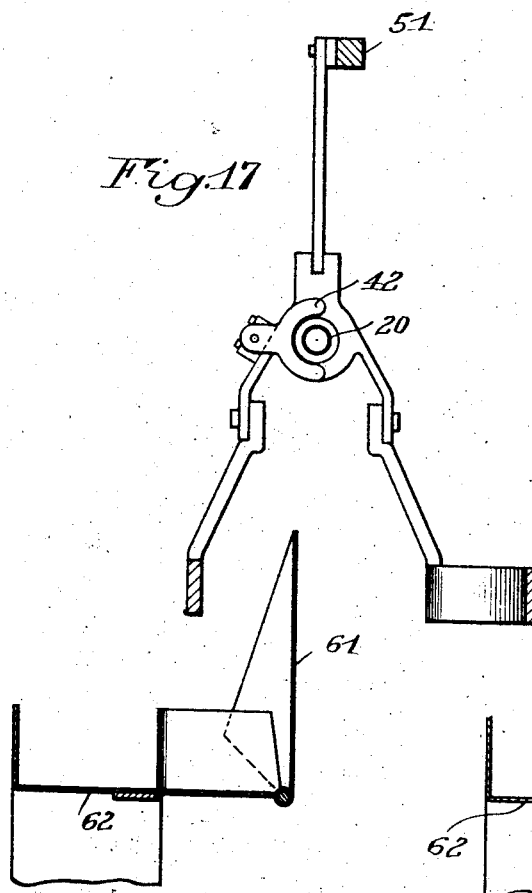
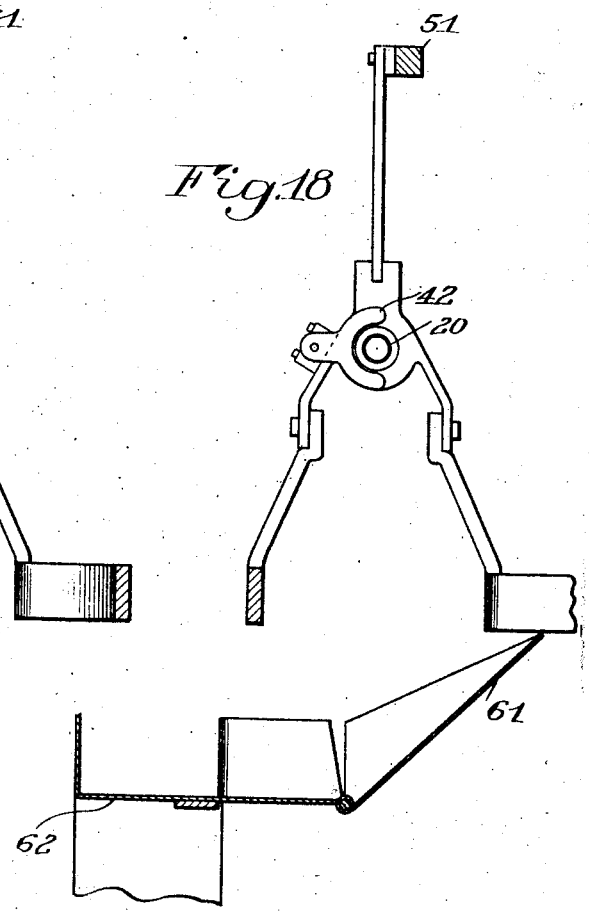
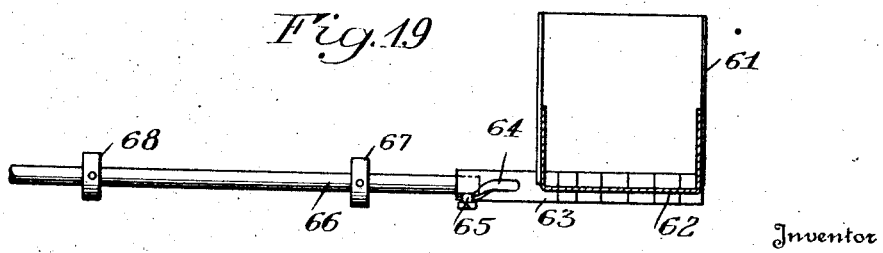
Inventor
Frank A. Reynolds
By Harold E. Stonebraker
his Attorney Patented Dec. 15, 1925.

1,565,960

UNITED STATES PATENT OFFICE.

FRANK A. REYNOLDS, OF GENEVA, NEW YORK, ASSIGNOR TO REYNOLDS MANUFACTURING CORPORATION, OF GENEVA, NEW YORK, A CORPORATION OF NEW YORK.

APPLE CORING AND PARING MACHINE.

Application filed August 14, 1925. Serial No. 50,235.

*To all whom it may concern:*

Be it known that I, FRANK A. REYNOLDS, a citizen of the United States of America, residing at Geneva, in the county of Ontario and State of New York, have invented certain new and useful Improvements in Apple Coring and Paring Machines, of which the following is a specification.

My invention relates to a machine for coring and paring apples, and has for its object to provide mechanism of simple design, which can be depended on to perform the required operations accurately and speedily.

Another purpose of the improvement is to afford a machine which can be fed faster than prior types of machines, enabling the operation of two machines by a single operator.

Still a further object of the invention is to provide mechanism that permits of coring and paring an apple with a minimum amount of waste, and without crushing or bruising the fruit.

An additional object of the improvement is to provide means that enables feeding the machine by positioning an apple loosely upon the lower one of a pair of gripping members, and gripping the exterior of the apple during the coring operation, without the necessity of using a fork or other instrumentality to penetrate the apple.

An additional contemplated purpose of the invention is to afford mechanism for successively performing the coring and paring operations, and effecting the paring operation while the apple is mounted upon, and during the return movement of, a rotating coring knife, after completion of the coring operation.

With these and other ends in view, the invention comprises the structure that will appear more clearly from the following description, when read in conjunction with the accompanying drawings, the several novel features being pointed out in the claims following the description.

In the drawings:

Figure 2 is a side elevation looking in the opposite direction to Figure 1;

Figure 3 is an end view, showing an apple in initial position;

Figure 4 is an enlarged end view, partially broken away, showing the position of the parts after the apple is engaged by the gripping members;

Figure 5 is a detail side elevation, with parts broken away, showing a portion of the drive;

Figure 6 is a similar side view, further broken away to show additional driving parts;

Figure 7 is a sectional view of the coring knife and coacting parts in coring position;

Figure 8 is a similar view after the coring knife has started to return;

Figure 9 is a similar view showing the coring knife upon completion of its return stroke;

Figure 10 is an enlarged sectional view of the coring knife, plunger, and retaining device when the coring knife is engaging an apple;

Figure 11 is a similar view showing the position of the parts as the plunger ejects the core and the retaining device enters the apple;

Figure 12 is a similar view of the parts in return position;

Figure 17 is a detail sectional view showing the discharge chute elevated;

Figure 18 is a similar view with the discharge chute lowered, and

Figure 19 is a side view of the discharge chute and controlling mechanism.

The purpose of the invention, and functions of the machine herein disclosed, may be accomplished in various ways, and it is to be understood that the present structure is merely illustrative of many practical applications, and does not limit the invention to any particular arrangement or construction of parts.

Figure 16:
Figure 16 is a detail plan view of one of the gripping members.

In the form shown, 1 and 2 designate respectively the lower and upper of a pair of triangularly curved gripping members which are preferably horizontally disposed and vertically movable, being mounted on suitable supporting posts 3 and 4, carried by slides 5 and 6 respectively. The gripping members 1 and 2 are shaped as shown in Figure 16, the lower one being adapted to loosely receive an apple position on its side, as shown in Figures 3 and 4, as the operator feeds the machine. The slides 5 and 6 are connected by racks 7 and 8 through pinion 9, so that as the lower slide 6 is moved upwardly, it operates the upper slide 5 downwardly. The rack 8 is mutilated at 10 to permit partial upward movement of the lower side and apple gripping member before downward movement of the upper slide commences, to permit conveniently positioning the apple. The post 4 connected to lower slide 6 has a yieldable telescopic connection with a tube 11 to permit yielding engagement of the gripping members with an apple, and tube 11 is operated from a link 12 and bell-crank 13, which in turn is operated from cam 14. After the apple is manually positioned on the lower gripping member 1, the latter initially moves upwardly and the upper gripping member 2 then moves downwardly until the apple is gripped at opposide sides. The gripping members engage the apple with sufficient pressure to hold it during entrance of the coring knife, while spring 15 permits a yieldable relationship between the gripping members 1 and 2 that causes the latter to readily accommodate themselves to apples of different sizes, and to center the core of the apple with reference to the coring knife, irrespective of the diameter of the apple.

20 designates the coring knife arranged horizontally as shown, and mounted on a rotating tubular support 21 which is endwise movable to first carry the coring knife into engagement with the apple and thereafter withdraw the coring knife from between the gripping members and carry the apple thence into cooperative relationship with a paring mechanism. The tubular support 21 carries collars 22 between which is arranged an arm 23 connected by link 24 with a lever 25 operated by cam 26, to effect the necessary endwise movement of the rotary tubular support 21 and coring knife 20. The tubular support 21 is slidably keyed within a sleeve 27 which has a power pulley 28 mounted thereon to impart rotation to the coring knife, in order to cause it to enter the apple easily, and to effect paring of the apple as it is brought into cooperative relation with a paring mechanism. 29 is a loose pulley arranged on sleeve 27 for a purpose that will appear later.

35 designates a paring knife, forming part of a paring mechanism which may be of any suitable or conventional form, the knife being arranged and controlled so as to engage the apple as it is carried along and rotated by the coring knife during return movement of the latter. During such travel of the coring knife and paring of the apple, it is necessary to prevent turning of the apple relatively to the coring knife and to retain the apple upon the coring knife. This is accomplished by a retaining device in the form of a knife or flange 36, mounted on a spring-pressed arm 37, and movable through an opening 38 in the coring knife. The retaining device 36 and arm 37 are mounted within a hollow plunger 39 which has an endwise movement relatively to the coring knife, causing the retaining device to be automatically projected into the body of the apple prior to the paring operation and automatically withdrawn from the apple after the paring operation is completed, to permit discharge of the apple from the machine. The plunger 39 carries a head or ejector $40^a$ which engages the core of the apple and forces it from the coring knife prior to discharging the apple. The relative movement of the coring knife and plunger 39 is effected as follows: Plunger 39 is loosely arranged within the support 21 and carries a plate 40 at its rear end, said plate 40 acting to engage sleeve 27, as shown in Figures 7 and 8, and thus limit forward movement of the plunger, while the coring knife moves to coring position. Upon return movement of the coring knife, plunger 39 is held in the position shown in Figure 7 by a stop 41, see Figures 1, 2, 7 and 8, until the core is discharged by ejector $40^a$, and the retaining device 36 enters the apple during the paring operation. After completion of the paring operation, support 21 moves rearwardly until it strikes plate 40, see Figure 8, causing withdrawal of retaining device 36 from the apple, see Figure 12, after which stop 41 is automatically lowered from the position of Figure 2 to that of Figure 1, permitting the plunger 39 to move rearwardly with support 21 until they reach the position of Figure 9, the apple being discharged by a doffer 42. Stop 41 is in the form of a vertically movable plate slidable on guide posts 43 and operated at predetermined intervals by a rock arm 44 which is controlled by a cam 45, see Figure 1.

Figure 1:
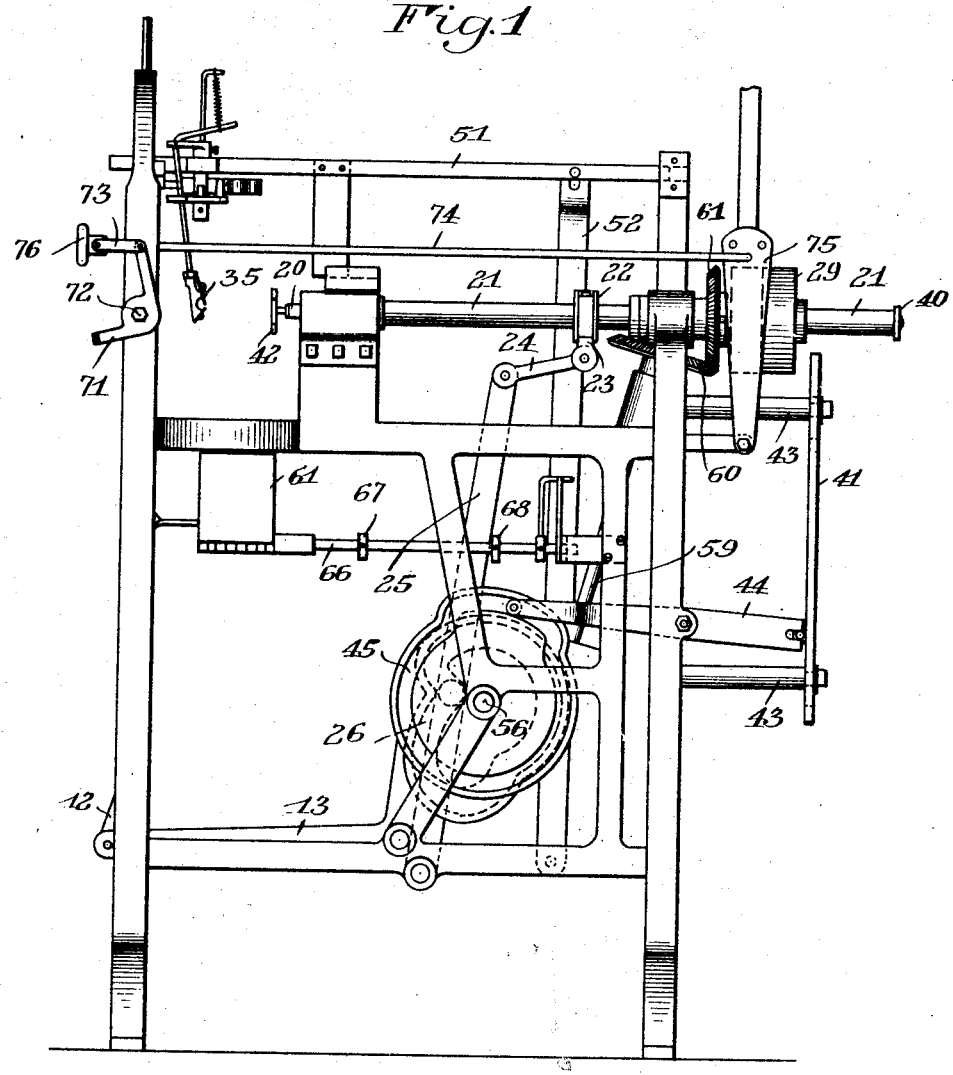
Figure 1 is a side elevation of a machine constructed in accordance with one embodiment of my invention.
Figure 13:
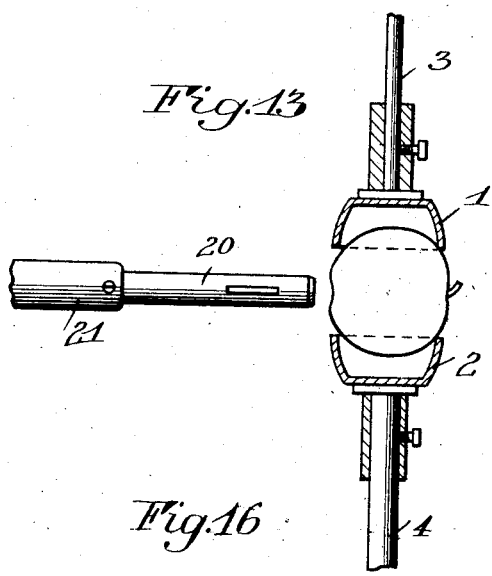
Figure 13 is a detail sectional view of the apple gripping members engaging an apple and the coring knife about to enter it.
Figure 14:
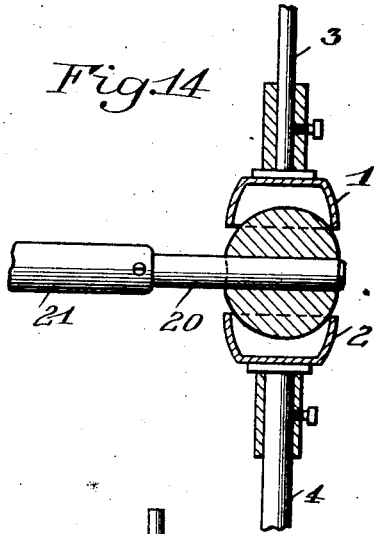
Figure 14 is a similar view with the coring knife in the apple.
Figure 15:
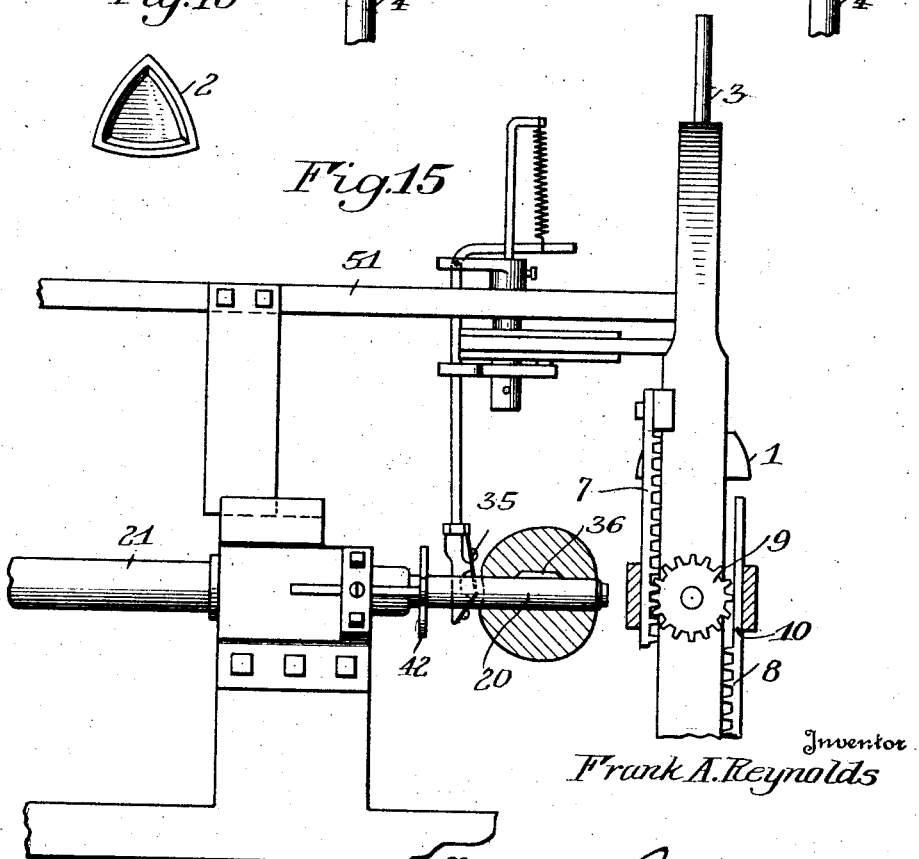
Figure 15 is a detail side elevation showing the coring knife and apple in paring relation to the paring mechanism.

The paring knife is automatically controlled through a laterally movable rod 51, see Figure 1, connected by a lever 52 with a link 53 which in turn is operated by an arm 54 controlled by a cam 55. The several cams previously described are mounted on a common cam shaft 56 that carries a worm gear 57 driven by worm 58 on a shaft 59, which is connected through bevel gears 60 and 61 with the aforementioned sleeve 27 on which the power pulley 28 is mounted. It will be understood that the various cams are suitably shaped to properly time the operations as hereinbefore mentioned, and to effect the several operations in proper sequence, which is briefly as follows: Starting with the parts in the position illustrated in Figures 1 and 3, an apple is placed in the lower gripping member by the operator, as shown in Figure 3. The lower gripping member raises, and after a predetermined elevating movement thereof, the upper gripping member 1 is automatically lowered until the apple is gripped, as shown in Figures 4 and 13. While this movement of the gripping members is taking place, the coring knife 20 is moving forwardly, and immediately after the apple is gripped, the coring knife enters it, as illustrated in Figures 4 and 14. It will be understood that the coring knife is rotating continuously during its forward and return movements, and as soon as it completes its forward movement, as shown in Figure 14, the gripping members move away from the apple. The coring knife then starts to move rearwardly with the apple thereon, as shown in Figure 15. When the coring knife reaches a certain predetermined position in its rearward movement, the core is ejected and retaining device 36 moves outwardly, as shown in Figures 8, 11 and 15, to retain the apple on the coring knife against relative rotating movement. The outward movement of the retaining device 36 takes place just before the apple reaches the paring knife 35, so that the apple is rotated with the coring knife as it passes the paring knife 35, the paring operation being effected by the movement of the paring knife 35 around the apple as the latter rotates. Upon completion of the paring operation and further return movement of the coring knife with the apple thereon, the retaining device 36 is withdrawn from the apple, as illustrated in Figure 12, and at the limit of the return movement of the coring knife, the apple is engaged by the doffer 42 and discharged from the machine, the parts then being ready for another operation.

Referring to Figures 17 to 19, 61 designates a pivoted discharge chute adapted to receive the apple as it leaves the machine when in the position shown in Figure 18. The chute 61 is pivotally mounted and adapted to move from the position shown in Figure 17 to that shown in Figure 18. It assumes the position shown in Figure 17 while the apple is moving through the machine, permitting the peelings to fall directly down from the machine. After completion of the paring operation, and before the apple is discharged, the chute 61 is automatically moved to the position of Figure 18 to receive the apple as it falls and carry it to the conveyor 62. To this end, the chute 61 is mounted on a sleeve 63 having a cam slot 64 engaged by a pin 65 on a rod 66, whereby the necessary tilting movement of the chute 61 is accomplished by endwise movement of the rod 66. Referring to Figure 1, said rod 66 carries stops 67 and 68 which are engaged at predetermined intervals by the connecting rod 25, which causes the necessary endwise travel of the coring knife and its tubular support. Thus, as the coring knife reaches the end of its forward movement, stop 67 is engaged and the chute tilted to the position illustrated in Figure 17, and as the connecting rod 25 and coring knife reach the limit of their return movements, stop 68 is engaged and the chute 61 is tilted to the position shown in Figure 18, to receive the apple at the completion of the cycle.

In order to prevent accidental injury to the hand of an operator, a guard 71 is employed which is pivoted at 72 and connected by link 73 with a rod 74 which extends to a belt shifter 75 acting to shift the power belt from the fast to the loose pulley. The guard 71 is so arranged with reference to the lower apple gripping member 2, see Figures 1 and 3, that if the operator holds a hand on the apple for too great a length of time during upward movement of the apple gripping member, or brings a hand into the path of the coring knife, the guard 71 is automatically engaged and tilted, which immediately operates the belt shifter and throws off the power. The power belt may be shifted back to the fast pulley by the operator pulling on handle 76 at the forward end of the rod 74.

While the invention has been set forth with reference to a certain structural embodiment, it is not limited in its application or scope to the details or particular arrangement herein shown, and this application is intended to cover any modifications or departures from the structure herein described that may come within the apparent purposes of the improvements, or its novel characteristics, or within the scope of the following claims.

I claim:

1. The combination with a pair of apple gripping members, of a coring knife movable endwise therebetween to enter an apple while held by the gripping members, and means for automatically separating the gripping members after the coring knife enters the apple and thereafter withdrawing the coring knife with the apple supported thereon.

2. The combination with a pair of reciprocatory apple gripping members arranged one above the other so as to hold an apple with its core horizontal, of a coring knife movable endwise and horizontally between the gripping members to enter an apple while held by the gripping members, and means for automatically separating the gripping members after the coring knife enters the apple and thereafter withdrawing the coring knife with the apple supported thereon.

3. The combination with a pair of apple gripping members, of a rotary coring knife movable endwise therebetween to enter an apple while held by the gripping members, means for automatically separating the gripping members after the coring knife enters the apple and thereafter withdrawing the coring knife with the apple supported thereon, and paring instrumentalities which cooperate with the apple while it is on the rotating coring knife and during return movement of the latter.

4. The combination with a pair of apple gripping members, of a rotary coring knife movable endwise therebetween to enter an apple while held by the gripping members, means for automatically separating the gripping members after the coring knife enters the apple and thereafter withdrawing the coring knife with the apple supported thereon, paring instrumentalities which cooperate with the apple while it is on the rotating coring knife and during return movement of the latter, and retaining means acting automatically to hold the apple against relative movement on the coring knife while it is pared and to release it after completion of the paring operation.

5. The combination with a pair of reciprocatory apple gripping members arranged one above the other so as to hold an apple with its core horizontal, of a rotary coring knife movable endwise and horizontally between the gripping members to enter an apple while held by the gripping members, means for automatically separating the gripping members after the coring knife enters the apple and thereafter withdrawing the coring knife with the apple supported thereon, and paring instrumentalities which cooperate with the apple while it is on the coring knife and during return movement of the latter.

6. The combination with a pair of reciprocatory apple gripping members arranged one above the other so as to hold an apple with its core horizontal, of a rotary coring knife movable endwise and horizontally between the gripping members, means for automatically separating the gripping members after the coring knife enters the apple and thereafter withdrawing the coring knife with the apple supported thereon, paring instrumentalities which cooperate with the apple while it is on the coring knife and during return movement of the latter, and retaining means acting automatically to hold the apple on the coring knife while it is pared and to release it after completion of the paring operation.

7. The combination with a pair of apple gripping members and a rotary coring knife on which the apple is retained after it is released by the apple gripping members, of paring mechanism which cooperates with the apple while it is on the coring knife.

8. The combination with a pair of apple gripping members and a rotary coring knife on which the apple is retained after it is released by the apple gripping members, of paring mechanism which cooperates with the apple while it is on the coring knife, and retaining means acting automatically to hold the apple on the coring knife during the paring operation.

9. The combination with a pair of apple gripping members and a rotary coring knife movable endwise between the gripping members to enter an apple and remove it after release by the gripping members, of paring mechanism which cooperates with the apple during return movement of the coring knife.

10. The combination with a pair of apple gripping members and a rotary coring knife movable endwise between the gripping members to enter an apple and remove it after release by the gripping members, of paring mechanism which cooperates with the apple during return movement of the coring knife, and retaining means acting automatically to hold the apple on the coring knife during the paring operation.

11. The combination with a coring knife, of means for holding an apple in position to receive the coring knife comprising a pair of horizontally disposed gripping members, the lower of which is adapted to have an apple positioned loosely therein, and means for thereafter effecting relative movement between the gripping members to engage the apple at opposite portions and hold it during entrance of the coring knife.

12. The combination in an apple handling machine, of apple supporting means comprising a pair of vertically movable horizontally disposed gripping members, the lower of which is adapted to have an apple positioned loosely therein, and means for subsequently effecting relative movement between the gripping members to cooperate with opposite portions of the apple.

13. The combination with oppositely arranged apple gripping members, of a rotary coring knife having endwise movement into the apple while engaged by the gripping members, paring mechanism which cooperates with the apple during return movement of the coring knife, and a retaining device movable radially of the coring knife into the body of the apple and acting to hold the apple on the coring knife during operation of the paring mechanism.

14. The combination with a pair of horizontally disposed vertically movable apple gripping members, the lower of which is adapted to have an apple positioned loosely therein, of means for effecting relative movement between said members to cooperate with opposite portions of the apple, a rotary coring knife movable endwise into the apple while it is held by the gripping members, paring mechanism cooperating with the apple during return movement of the coring knife, retaining means operable to hold the apple on the coring knife after the gripping members are released and during return movement of the coring knife, and means for successively ejecting the core and discharging the apple from the coring knife following the paring operation.

15. The combination with a pair of reciprocatory apple gripping members, of a coring knife movable endwise between the gripping members to enter an apple when held thereby, and means for automatically separating the gripping members as the coring knife enters the apple and thereafter withdrawing the coring knife with the apple supported thereon.

16. The combination with a pair of reciprocatory apple gripping members connected for simultaneous movement toward and from each other, of a coring knife, means for effecting relative movement between the coring knife and gripping members to cause the coring knife to enter an apple, and means for separating the gripping members as the coring knife enters the apple and thereafter withdrawing the coring knife with the apple mounted thereon.

17. The combination with a pair of apple gripping members of a rotary coring knife, means for effecting relative movement of the coring knife and gripping members to cause the coring knife to enter an apple, means for automatically separating the gripping members as the coring knife enters the apple, paring mechanism, and means for moving the coring knife to present the apple to the paring mechanism.

18. The combination with a rotary coring knife, of paring mechanism, means for retaining an apple on the coring knife and instrumentalities for moving the coring knife to bring the apple into paring relation with the paring mechanism.

19. The combination with a coring knife, of means for holding an apple in position to be engaged by the coring knife comprising a pair of triangularly shaped gripping members for engaging the sides of an apple.

20. The combination with a coring knife, of means for holding an apple in position to be engaged by the coring knife comprising a pair of reciprocatory triangularly shaped gripping members arranged for engaging the sides of the apple, and mechanism for moving the gripping members simultaneously.

21. The combination with an apple coring machine, of gripping members comprising oppositely disposed triangularly shaped jaws, and means for moving the jaws simultaneously.

22. Apple gripping means comprising a lower gripping member on which an apple can be positioned upon one side, an upper gripping member adapted to engage the opposite side of the apple, and means for effecting relative movement between said gripping members.

23. Apple gripping means comprising a lower gripping member on which an apple can be positioned upon one side, and an upper gripping member adapted to engage the opposite side of the apple, the lower gripping member being movable upwardly, and the upper gripping member being movable downwardly at a predetermined point in the upward travel of the lower gripping member.

In witness whereof, I have hereunto signed my name.

FRANK A. REYNOLDS.